(12) United States Patent
Ajjan

(10) Patent No.: US 11,159,926 B2
(45) Date of Patent: Oct. 26, 2021

(54) PROVIDING TELECOMMUNICATION SERVICES FOR GUESTS

(71) Applicant: Carrier Corporation, Palm Beach Gardens, FL (US)

(72) Inventor: Naveen Ajjan, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/640,606

(22) PCT Filed: Aug. 14, 2018

(86) PCT No.: PCT/US2018/046682
§ 371 (c)(1),
(2) Date: Feb. 20, 2020

(87) PCT Pub. No.: WO2019/040322
PCT Pub. Date: Feb. 28, 2019

(65) Prior Publication Data
US 2020/0178051 A1    Jun. 4, 2020

(30) Foreign Application Priority Data
Aug. 23, 2017  (IN) .............................. 201711029815

(51) Int. Cl.
*H04M 3/54* (2006.01)
*H04W 48/02* (2009.01)
(Continued)

(52) U.S. Cl.
CPC .......... *H04W 4/50* (2018.02); *G07C 9/00174* (2013.01); *G07C 9/00904* (2013.01);
(Continued)

(58) Field of Classification Search
None
See application file for complete search history.

(56) References Cited

U.S. PATENT DOCUMENTS

| 6,233,448 | B1 * | 5/2001 | Alperovich | ....... H04M 3/42229 455/414.1 |
| 7,315,823 | B2 | 1/2008 | Brondrup | |

(Continued)

FOREIGN PATENT DOCUMENTS

| WO | 2013049730 A1 | 4/2013 |
| WO | 2017062182 A1 | 4/2017 |

OTHER PUBLICATIONS

Alcatel-Lucent, "Mobile Application Enables Guest Bring-Your-Own-Device 6BYOD7 Services for the Hospitality Industry", Mar. 2016, 2 pages.

(Continued)

*Primary Examiner* — Gary Lafontant
(74) *Attorney, Agent, or Firm* — Cantor Colburn LLP

(57) ABSTRACT

A method and system of providing telecommunication services for guests is disclosed. A guest's registration is received. An app on a mobile electronic device is linked to the registration. Calling features are activated based on the registration. The app on the mobile electronic device is connected to an external phone system so the mobile electronic device can be used to place and receive calls through the external phone system.

12 Claims, 4 Drawing Sheets

(51) Int. Cl.

| | | |
|---|---|---|
| *H04W 4/50* | (2018.01) | |
| *H04W 4/60* | (2018.01) | |
| *G07C 9/00* | (2020.01) | |
| *H04L 29/06* | (2006.01) | |
| *H04W 4/021* | (2018.01) | |

(52) U.S. Cl.
CPC ......... *H04L 65/1006* (2013.01); *H04W 4/021* (2013.01); *H04W 4/60* (2018.02); *G07C 2009/00793* (2013.01); *H04L 65/1053* (2013.01)

(56) References Cited

U.S. PATENT DOCUMENTS

| | | | |
|---|---|---|---|
| 9,129,450 | B2 | 9/2015 | Robertson et al. |
| 9,674,692 | B2 * | 6/2017 | Quiros ................ H04M 3/4234 |
| 2004/0025053 | A1 * | 2/2004 | Hayward ............ G06F 21/6245 726/26 |
| 2007/0050197 | A1 | 3/2007 | Efron |
| 2010/0191551 | A1 | 7/2010 | Drance et al. |
| 2012/0011033 | A1 | 1/2012 | Salgia |
| 2013/0336238 | A1 | 12/2013 | Converse et al. |

OTHER PUBLICATIONS

AppCrawlr, "Movitas Hotel Application", available at: https://apperawlr.com/ios/movitas-hotel, accessed Feb. 19, 2020, 2 pages.
astTECS Communications, "Mobile App based IP-PBX Systems", available at: https://www.asttecs.com/app-based-ip-pbx-systems/?gclid=Cj0KEQjw-ezKBRCGwqyK0rHzmvkBEiQAu-_-LMYGAh37_iwAQD0cZfCCc2Qz4Uq_wzyEUfg2dYH51nlaAt6B8P8HAQ, 2020, 4 pages.
Connected Guests, "iConnect: Guest Smart Device Application with Telephony Integration", 2016, 4 pages.
International Search Report and Written Opinion for application PCT/US2018/046682, dated Nov. 20, 2018, 11 pages.
Phonesuite, "Phonesuite Application by Voiceware", 2017, 4 pages.
RoomAssistant, "RoomAssistant" available at: https://roomassistant.com/features/?section=hotel, accessed Feb. 19, 2020, 8 pages.
Yeastar, "Yeastar Hotel App for Easy Hotel Management on S-Series VoIP PBX", available at: https://www.yeastar.com/blog/new-hotel-app-easy-hotel-management-s-series-voip-pbx/, Apr. 6, 2017, 6 pages.

\* cited by examiner

PROVIDING TELECOMMUNICATION SERVICES FOR GUESTS

BACKGROUND

The present disclosure relates in general to phone systems. More specifically, this disclosure relates to systems and methods for providing mobile calling services for hotel guests.

Hotels commonly have landline telephones in every room. When a guest desires to contact the hotel (e.g., to request room service or other services), the guest must use the landline telephone. But the landline telephones require periodic servicing and can be costly to maintain. With the proliferation of mobile telephony, hotel guests typically have mobile phones with them. When compared to the convenience delivered by mobile phones over landline phones, it can be desirable to leverage a guest's mobile telephone to contact the hotel.

BRIEF DESCRIPTION

According to one embodiment, a computer implemented method includes receiving a registration for a guest; linking an app executing on a mobile electronic device to the registration; activating calling features based on the registration; and connecting the app to an external phone system such that the mobile electronic device can be used to place phone calls through the external phone system.

In addition to one or more of the features described above, or as an alternative, further embodiments may include wherein: the registration includes location information for the registration; and activating calling features based on the registration comprises using positioning features of the mobile electronic device to determine if the mobile electronic device is in proximity to the location information for the registration.

In addition to one or more of the features described above, or as an alternative, further embodiments may include wherein the location information comprises a location of a hotel.

In addition to one or more of the features described above, or as an alternative, further embodiments may include wherein the registration includes time information for the registration, including a check-in date and a check-out date; and activating calling features based on the registration comprises activating the calling features at the time of the check-in date.

In addition to one or more of the features described above, or as an alternative, further embodiments may include wherein activating calling features based on the registration comprises activating the calling features when the guest checks in.

In addition to one or more of the features described above, or as an alternative, further embodiments may include wherein activating calling features based on the registration comprises activating the calling features when the guest uses the mobile electronic device to unlock a room assigned to the guest.

In addition to one or more of the features described above, or as an alternative, further embodiments may include deactivating calling features based on the registration.

In addition to one or more of the features described above, or as an alternative, further embodiments may include wherein the registration includes time information for the registration, including a check-in date and a check-out date; and deactivating calling features based on the registration comprises deactivating the calling features at the time of the check-out date.

In addition to one or more of the features described above, or as an alternative, further embodiments may include wherein deactivating calling features based on the registration comprises deactivating the calling features when the guest checks out or someone new guest checks into the guest's room.

In addition to one or more of the features described above, or as an alternative, further embodiments may include deactivating calling features based on the location of the mobile electronic device.

In addition to one or more of the features described above, or as an alternative, further embodiments may include wherein connecting the app to an external phone system such that the mobile electronic device can be used to place phone calls through the external phone system further comprises using a session initiation protocol to couple the mobile electronic device to the external phone system.

In addition to one or more of the features described above, or as an alternative, further embodiments may include wherein the external phone system is a public branch exchange (PBX) system.

In addition to one or more of the features described above, or as an alternative, further embodiments may include wherein the guest is located at a hotel and the external phone system is the hotel's PBX system.

In addition to one or more of the features described above, or as an alternative, further embodiments may include wherein the guest is located at a hospital and the external phone system is the hospital's PBX system.

In addition to one or more of the features described above, or as an alternative, further embodiments may include connecting the app to an external phone system such that the mobile electronic device can be used to receive phone calls through the external phone system based on the guest's registration information.

According to one embodiment, a computer program product includes a computer readable storage medium having program instructions embodied therewith, wherein the computer readable storage medium is not a transitory signal per se, the program instructions executable by a processor to cause the processor to: receive a registration for a guest; link the processor to the registration; activate calling features based on the registration; and connect the processor to an external phone system such that a mobile electronic device that uses the processor can be used to place phone calls through the external phone system.

In addition to one or more of the features described above, or as an alternative, further embodiments may include wherein the registration includes location information for the registration; and activating calling features based on the registration comprises using positioning features of the mobile electronic device to determine if the mobile electronic device is in proximity to the location information for the registration.

In addition to one or more of the features described above, or as an alternative, further embodiments may include wherein the location information comprises a location of a hotel.

In addition to one or more of the features described above, or as an alternative, further embodiments may include wherein the registration includes time information for the registration, including a check-in date and a check-out date;

and activating calling features based on the registration comprises activating the calling features at the time of the check-in date.

In addition to one or more of the features described above, or as an alternative, further embodiments may include wherein activating calling features based on the registration comprises activating the calling features when the guest checks in.

In addition to one or more of the features described above, or as an alternative, further embodiments may include wherein the customized information is chosen from one or more of the following: news, weather, schedule information, and advertisements.

In addition to one or more of the features described above, or as an alternative, further embodiments may include wherein moving the information comprises moving information from a first display unit to a second display unit.

According to one embodiment, a computer program product comprises a computer readable storage medium having program instructions embodied therewith, wherein the computer readable storage medium is not a transitory signal per se, the program instructions executable by a processor to cause the processor to: sense a user's location; display customized information to the user in proximity to the user; and move the customized information as the user changes location.

In addition to one or more of the features described above, or as an alternative, further embodiments may further comprise: sensing the user's location using one or more three-dimensional sensors.

In addition to one or more of the features described above, or as an alternative, further embodiments may include wherein the computer instructions are further configured to:
sense the user's location using one or more three-dimensional sensors selected from one or more of the following: a time-of flight sensor, an infrared sensor used with an infrared emitter, a radio frequency modulated light source with phase detector, a range gated imager, a direct time-of flight imager, a depth sensor, and a video camera.

Technical effects of embodiments of the disclosure include a system that dynamically displays information at the location of a user.

These and other advantages and features will become more apparent from the following description taken in conjunction with the drawings.

Additional features are realized through the techniques of the present disclosure. Other embodiments are described in detail herein and are considered a part of the claims. For a better understanding of the disclosure with the features, refer to the description and to the drawings.

BRIEF DESCRIPTION OF THE DRAWINGS

The subject matter which is regarded as the disclosure is particularly pointed out and distinctly claimed in the claims at the conclusion of the specification. The forgoing features are apparent from the following detailed description taken in conjunction with the accompanying drawings in which:

Figure 1:
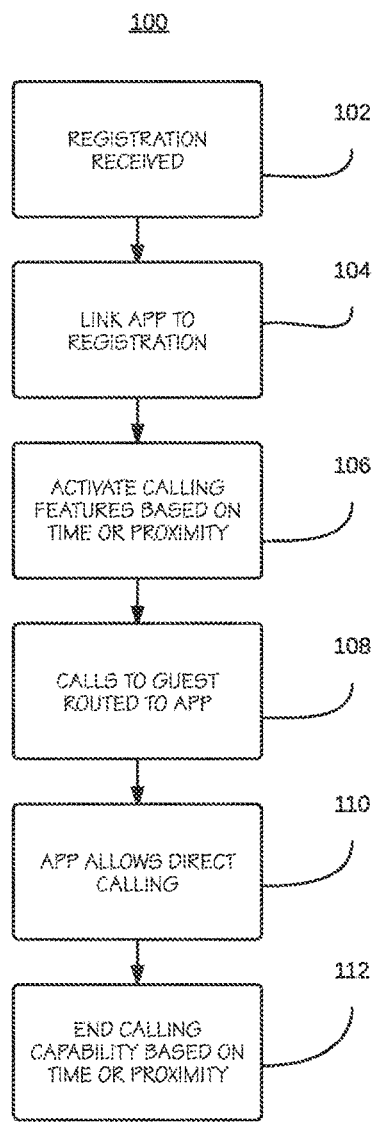
FIG. 1 is a flowchart illustrating the operation of one or more embodiments.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood that this disclosure is no limited to the particular embodiments illustrated herein.

DETAILED DESCRIPTION

Various embodiments will now be described with reference to the related drawings. Alternate embodiments may be devised without departing from the scope of this detailed description. Various connections might be set forth between elements in the following description and in the drawings. These connections, unless specified otherwise, may be direct or indirect, and the present description is not intended to be limiting in this respect. Accordingly, a coupling of entities may refer to either a direct or an indirect connection.

As described above, a hotel typically has multiple rooms for guests. Each room typically has a landline telephone. With the landline telephone, a guest can connect to the hotel to request room service, make requests of the front desk, contact other guests, and make calls to other telephones.

In the past, a landline telephone was very useful. However, the proliferation of mobile telephones has resulted in the landline telephone being not used as much to make external phone calls.

Although landline telephones are used less than in the past, they still have associated costs. They need to be repaired. They need to be maintained. They need to be replaced.

However, there are limitations to mobile telephones in hotels. Hotel guests still often desire to contact hotel staff with a landline telephone, that can typically be performed by pressing a single button. With a mobile telephone, the guest needs to look up the phone number, then be forwarded to a receptionist. In addition, cell phone reception can be poor in some indoor locations, making mobile telephones not as useful in certain circumstances.

Turning now to an overview of one or more embodiments, a hotel guest can connect to a hotel's telephone network (such as a private branch exchange (PBX), or an IP PBX telephone system). Thereafter, an app on the mobile telephone can allow the user to easily contact different areas of the hotel (e.g., room service, housekeeping, maintenance, concierge, etc.).

There may already be an app on the mobile telephone for a particular hotel. For example, some hotel chains can utilize a mobile telephone as a room key. Such an app can be expanded upon to provide the above-described functionality.

The app can use any type of mobile telephony technology to connect to the hotel's telephone network. Cellular protocols, such as UMTS, W-CDMA, HSPA+, CDMA2000, EDGE, 3GPP LTE, LTE Advanced, WiMAX, and other protocols used in the past or developed in the future can be used to connect the mobile telephone to the Internet and then to the hotel's PBX or other telephone system. In addition, any type of internet connectivity, such as a WiFi network, can be used to couple the mobile telephone to the Internet. Using the Internet, connection can be made to the hotel's PBX network. Using a WiFi network can alleviate potential difficulties with connecting to a cellular provider's network while indoors. In addition, because voice over IP (VOIP) technology can be used in one or more embodiments for purposes of communicating via the mobile phone, the mobile phone can connect via any type of telephone network in addition to a PBX network. For example, a Session Initiation Protocol (SIP) connection can be made that treats a mobile phone as a "soft phone" using the hotel's telephone and/or Internet connectivity. While a "mobile phone" is discussed in various embodiments, it should be understood that embodiments are not so limited. Any type of mobile electronic device, such as a smartphone, tablet, eReader, laptop computer, and the like can be used in one or more embodiments.

The method described above can be illustrated in flowchart form. FIG. 1 depicts a flowchart illustrating a method 100 according to embodiments of the invention. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined, skipped, or performed in a different order.

A registration is received (block 102). For example, a guest registers at a hotel. The hotel confirms that the guest is registered at the hotel, the length of the stay, and the like. An app on the guest's mobile phone is linked to the registration (block 104). In some embodiments, the registration can be made via the app on the guest's mobile phone app.

Upon arrival, the calling features of the app are activated (block 106). The arrival can be detected in one of a variety of different manners. In some embodiments, the app can be used to unlock the door of the guest's hotel room. In such an embodiment, the app can detect that it was used to unlock the door and activate the calling features of the app. In some embodiments, location features of the mobile phone (such as a GPS) can be used to detect when the guest is in the vicinity of the hotel. In some embodiments, if a WiFi network is detected by the mobile phone, the calling features can be activated. In some embodiments, the dates of the reservation are used to determine when to activate the calling features. In some embodiments, the app detects when a user checks in to the hotel. In one or more embodiments, the app is linked to the hotel's registration system such that the app that is associated with the guest (e.g., the app loaded on the guest's mobile phone) is notified when the guest performs certain actions (such as checking in or unlocking a door).

Once the calling features are activated, a variety of different actions can take place. For example, any attempts to call the guest via the hotel can be routed through the app (block 108). Thus, if someone calls the hotel and asks to be transferred to the guest (by the guest's room number), the call is routed to the guest's mobile phone. Similarly, if the hotel wants to call the guest, the call is routed to the guest's mobile phone. In some embodiments, this feature can be made optional, because some guests might not want to receive calls on their mobile phone. Some guests might prefer to receive calls on their mobile phone because they will not have to share their mobile phone number with the hotel.

The app can provide the ability for the guest to contact various parts of the hotel quickly (block 110). For example, the guest can access the front desk at the push of a button. The guest can access other areas of the hotel, such as a restaurant to make a reservation, room service to place an order, the front desk to make a request for a porter or housekeeping, the concierge to request assistance, emergency services in case of emergency, and the like. The app can provide information that is useful to visitors, such as maps of the hotel and surrounding areas, lists of interesting places to visit, and the like. The app can also provide services, such as wake up calls. The app also can provide call forwarding features. For example, the guest can select a default number to which phone calls to the room are forwarded. The guest could also provide an alternate number of another person residing in the same hotel. The app can also provide advertisements for upcoming events, both in the hotel and in the surrounding communities. In some embodiments, the guest can have the ability to place calls to another guest's room or outside the hotel for official or personal purposes. The hotel could configure default charges (who has to pay for phone calls if the call incurs fees). As stated above, the calls placed to and from the guest's mobile phone can utilize the mobile phone's Internet connectivity or can use the hotel's Internet connectivity (such as via WiFi or other wireless Internet protocols developed in the future.)

Once the guest checks out of the hotel, the calling capability ends (block 112). This can occur in one of a variety of different manners. For example, the guest's reservation details can be used as a signal to end the capability. If the user checks out on a Saturday, the user's calling capability ends when the user checks out or at the designated check out time. In such embodiments, the app is linked to the hotel's registration information and receives updates when the guest checks out. In some embodiments, the calling capability can end when a different person checks in to the same room that the guest was using. Thus, the check-in of a room to another person can serve as a check-out of the guest. In some embodiments, location features of the mobile phone can be used to determine when the calling capability is active. In such an embodiment, the guest can be restricted from directly calling parts of the hotel when the guest is not located at the hotel. In other embodiments, the guest can have access to calling features even when the guest is not located on the hotel's property.

Several advantages are present in such a system. From the hotel's point of view, they will not have to maintain as many telephone handsets. The hotel could ask each guest if they wish to have a phone and only issue phones to requesting guests. The guest benefits because they have additional functionality on them at all times. In addition, by utilizing the hotel's Internet and telephone networks from their own mobile phone, the guest can minimize roaming charges that can be incurred while traveling at a great distance from the guest's home.

While one or more embodiments are described above with reference to a hotel, embodiments are not so limited. Capabilities described above can be used in a variety of different situations. A hospital can utilize one or more embodiments to enable patients, visitors, and hospital workers to utilize the hospital's Internet infrastructure via their mobile phone. Patients and visitors would have easy access to contact a nurse or doctor instead of using the hospital's phone system. Similarly, certain office buildings can utilize one or more embodiments in order to allow their employees and visitors to access the features described above.

For other exemplary situations, real estate agents can have an app that allows them to access to a lockbox that contains keys for houses. Embodiments described above can be used in those situations such that the real estate agent has access to the home's Internet for telephony purposes while he is in the house, along with having one button access to contact the owner of the house.

In another embodiment, a restaurant can utilize an embodiment for customers. Once the customer arrives at the restaurant and registers, the customer can utilize the restaurant's Internet in the manner described above. In such a manner, the customer can easily contact a waiter to place an order or a bartender to request a drink.

In another embodiment, an app that allows access to elevators can also provide the services described above. If an elevator becomes stuck or otherwise in need of service, a passenger can utilize an embodiment to request service or inform someone of the problem with the elevator.

In another embodiment, if a hotel has no PBX, then the app can directly call hotel services based on phone numbers configured on the server end, using the guest's phone.

Figure 2:
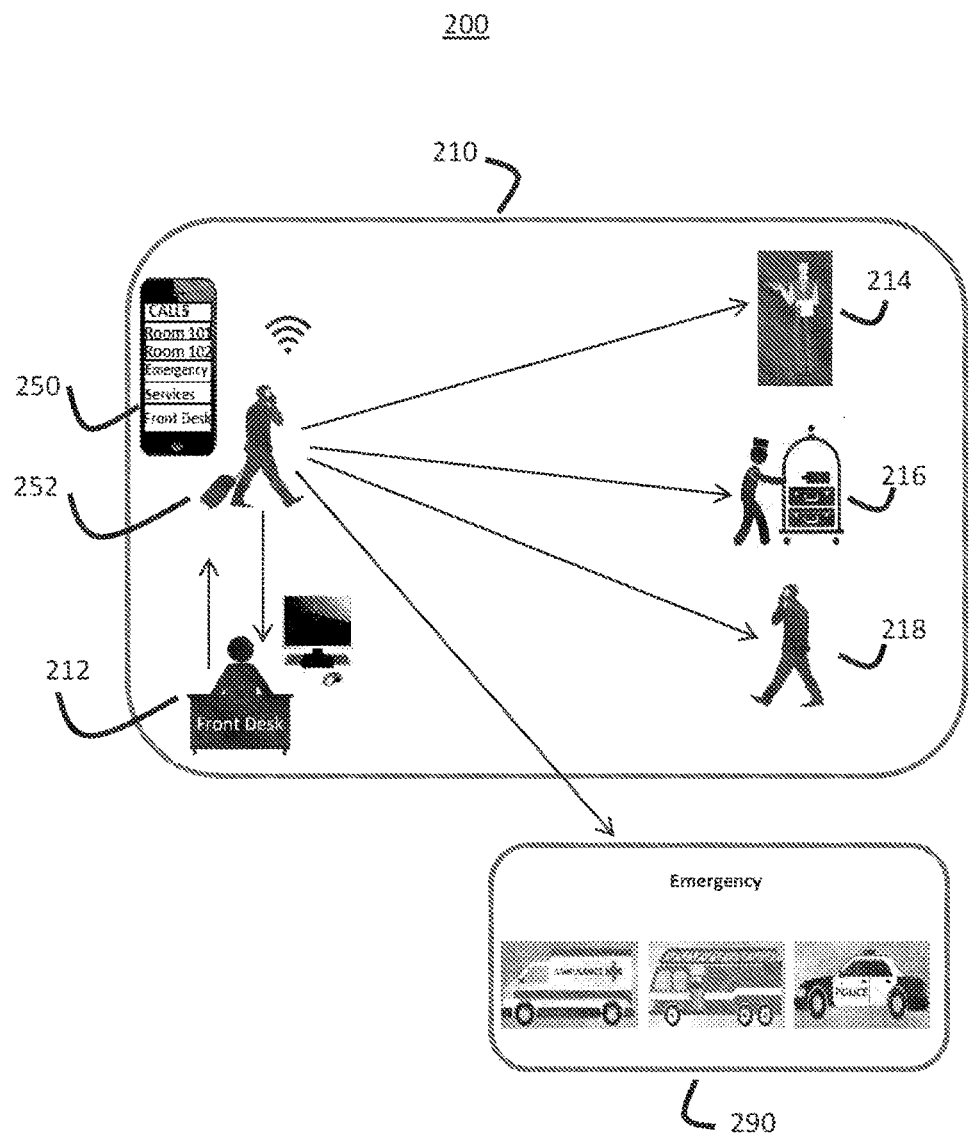
FIG. 2 is a block diagram illustrating one or more embodiments.

With respect to FIG. 2, a block diagram of a system 200 capable of operating one or more embodiments is shown. System 200 illustrates how a guest interacts with a hotel 210. Guest 252 has a mobile phone 250. As illustrated, mobile phone 250 has an app that allows guest 252 to directly connect to various portions of the hotel, via the hotel's communication infrastructure (such as a PBX system, not shown). Portions of the hotel that guest 252 can connect with include room service 214, porters 216, and concierge 218. Guest 252 can also connect with front desk 212. This can be done at initial check in. In addition, guest 252 can connect with front desk 212 for other purposes. In addition, guest 252 can connect to emergency services 290, to connect with emergency providers such as fire, police, and medical services.

Figure 3:
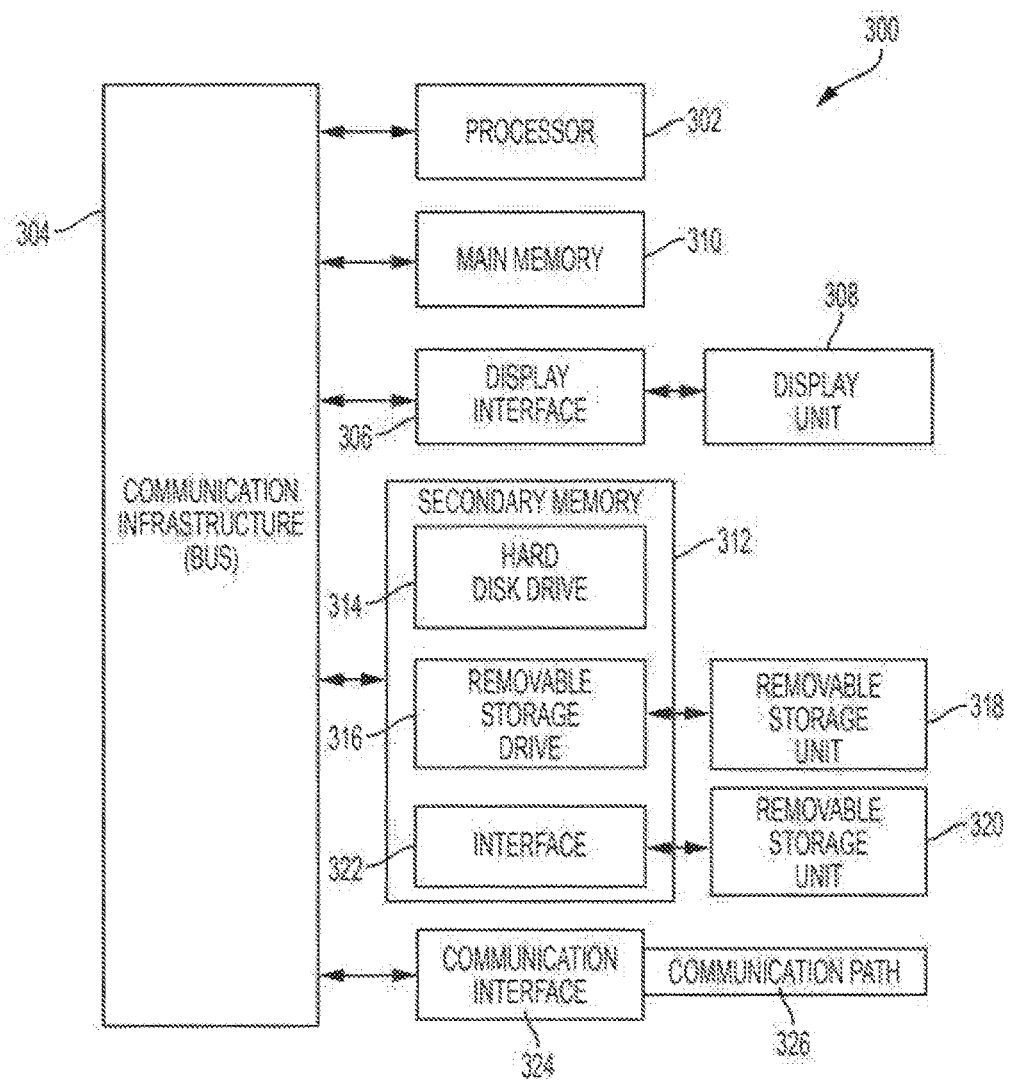
FIG. 3 is a block diagram illustrating an exemplary computer system.

FIG. 3 depicts a high-level block diagram of a computer system 300, which can be used to implement one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them. While numerous components are illustrated in FIG. 3, some embodiments might not include every illustrated component.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can also include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
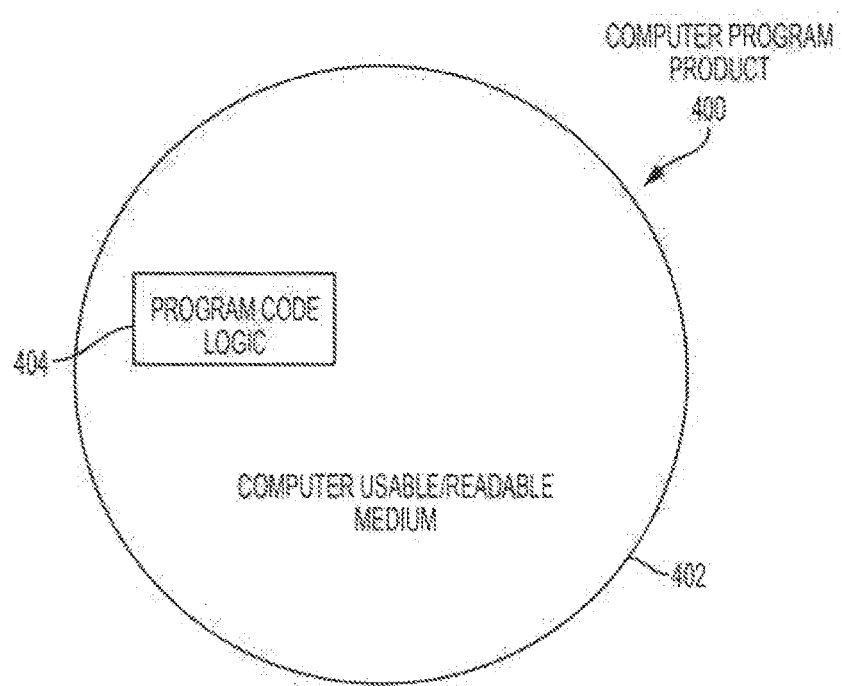
FIG. 4 illustrates a computer program product.

Referring now to FIG. 4, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

From the foregoing, it can be seen that the system and method described herein has industrial applicability in a variety of settings involving the use of customized dynamic displays. Using the teachings of the present disclosure, a customized dynamic display may be constructed to improve the experience of users.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer implemented method comprising:
   receiving a registration for a guest;
   linking an app executing on a mobile electronic device to the registration;
   activating calling features for the guest; and
   connecting the app to an external phone system such that the mobile electronic device can be used to place phone calls through the external phone system;
   wherein activating calling features comprises activating the calling features when the guest uses the mobile electronic device to unlock a room assigned to the guest.

2. The computer implemented method of claim 1, further comprising:
   deactivating calling features based on the registration.

3. The computer implemented method of claim 2, wherein:
   the registration includes time information for the registration, including a check-in date and a check-out date; and
   deactivating calling features based on the registration comprises deactivating the calling features at the time of the check-out date.

4. The computer implemented method of claim 2, wherein:
   deactivating calling features based on the registration comprises deactivating the calling features when the guest checks out or when the guest's room is checked in to a different user.

5. The computer implemented method of claim 2, further comprising:
   deactivating calling features based on the location of the mobile electronic device.

6. The computer implemented method of claim 1, wherein:
   connecting the app to an external phone system such that the mobile electronic device can be used to place phone calls through the external phone system further comprises using a session initiation protocol to couple the mobile electronic device to the external phone system.

7. The computer implemented method of claim 6, wherein the external phone system is a public branch exchange (PBX) system.

8. The computer implemented method of claim 1, wherein the guest is located at a hotel and the external phone system is the hotel's PBX system.

9. The computer implemented method of claim 1, wherein the guest is located at a hospital and the external phone system is the hospital's PBX system.

10. The computer implemented method of claim 1, further comprising:
    connecting the app to an external phone system such that the mobile electronic device can be used to receive phone calls through the external phone system based on the guest's registration information.

11. A computer program product, the computer program product comprising a computer readable storage medium having program instructions embodied therewith, wherein the computer readable storage medium is not a transitory signal per se, the program instructions executable by a processor to cause the processor to:
    receive a registration for a guest;
    link the processor to the registration;
    activate calling features for the guest; and
    connect the processor to an external phone system such that a mobile electronic device that uses the processor can be used to place phone calls through the external phone system;
    wherein activating calling features based on the registration comprises activating the calling features when the guest uses the mobile electronic device to unlock a room assigned to the guest.

12. The computer program product of claim 11, wherein:
    the registration includes time information for the registration, including a check-in date and a check-out date; and
    activating calling features based on the registration comprises activating the calling features at the time of the check-in date.

* * * * *